United States Patent Office 3,475,197
Patented Oct. 28, 1969

3,475,197
METHOD FOR COATING SURFACES COMPRISING A RUBBER COMPOSITION
Anthony G. Marriott, Hall Green, England, assignor to The Dunlop Company Limited, London, England, a British company
No Drawing. Filed Sept. 16, 1966, Ser. No. 579,828
Claims priority, application Great Britain, Sept. 30, 1965, 41,666/65
Int. Cl. B44d 1/14, 1/22
U.S. Cl. 117—72
13 Claims

ABSTRACT OF THE DISCLOSURE

Coating a surface comprising natural or synthetic rubber composition by applying thereto an interlayer of a graft polymer of a vinyl monomer and a natural or synthetic rubber, gelling said graft polymer, applying to the gelled composition an aqueous solution or emulsion of a polyacrylate while the grafted polymer is wet, drying the gelled composition containing the polyacrylate and applying to the interlayer an outer layer of an aqueous polymeric composition based on nitrocellulose or acrylic polymer.

---

This invention relates to a method for coating surfaces and particularly to a method for coating surfaces consisting at least in part of natural or synthetic rubber compositions such as the surfaces of leather-like sheet materials comprising a fibrous web bonded with a natural or synthetic rubber composition, and is an improvement in or modification of the invention described and claimed in U.S. Patent No. 3,377,194.

In U.S. Patent No. 3,377,194 there is described and claimed a method of coating a surface consisting at least in part of a natural or synthetic rubber composition which comprises applying to the surface an interlayer of a composition of a graft polymer of both a vinyl monomer and a natural or synthetic rubber and applying to the interlayer an outer layer of an aqueous polymeric composition.

We have now found that increased adhesion between the graft copolymer interlayer and the outer layer is obtained if the interlayer is treated with a polyacrylate prior to application of the outer layer.

According to the present invention a method for coating a surface consisting at least in part of a natural or synthetic rubber composition comprises applying to the surface an interlayer of a composition of a graft polymer of both a vinyl monomer and a natural or synthetic rubber, gelling the composition of a graft polymer, applying to the gelled composition a solution or emulsion of a polyacrylate whilst the graft polymer composition is still wet, drying the gelled composition containing the polyacrylate, and applying to the interlayer an outer layer of an aqueous polymeric composition.

According to the present invention also there is provided an article having a surface consisting at least in part of a natural or synthetic rubber composition and having adhered to the surface a coating produced by the method according to the immediately preceding paragraph.

The composition of a graft polymer will usually be gelled by heating the composition and this can conveniently be effected by subjecting the composition to a hot humid atmosphere, preferably to live steam for a short period of time, say about three minutes. A solution or emulsion of a polyacrylate is then applied to the gelled composition whilst the latter is wet, i.e. whilst the gelled composition contains serum so that at least a portion of the serum is displaced by the solution or emulsion of a polyacrylate. The gelled composition containing the polyacrylate is then dried, prior to application of the outer layer, for example by heating it at about 70° C. in an air oven for a period of say fifteen minutes. The solution or emulsion of a polyacrylate should be applied to the gelled composition whilst the latter still contains serum or before it is sufficiently dry to prevent absorption of the solution or emulsion of the polyacrylate since it is not sufficient merely to apply the solution or emulsion to the surface of the dried gelled composition.

The polyacrylate which is applied to the gelled composition of a graft polymer can be ammonium polyacrylate or an acrylic polymer such as a polymer of methyl methacrylate with one or more acrylic or non-acrylic monomers such as ethyl acrylate, butyl hexyl acrylate and methacrylic acid. The ammonium polyacrylate is generally used in the form of an aqueous solution. Alternatively, an aqueous emulsion of the polyacrylate can be used. The solution or emulsion can be applied to the gelled composition of a graft polymer by a suitable technique such as spraying.

Preferably the aqueous polymeric composition forming the outer layer is an acrylic polymer composition or a nitrocellulose composition, the acrylic polymer composition being particularly preferred. The polymeric material may be in solution or dispersion in water. It is to be understood that the phrase "aqueous polymeric composition" is used in this specification to include both a polymeric composition carried in water (an emulsion) and such a composition after the carrier water has been wholly or partly removed.

The invention will be described with particular reference to coatings for surfaces of leather-like sheet material comprising a textile web bonded with a natural or synthetic rubber composition. Suitable sheet material is a leather-like sheet material comprising a consolidated mat of interpenetrated crimped continuous filaments bonded together with a resinous or elastomeric bonding agent, the interpenetration of the filaments being in the nature of an intermingling at random in three dimensions produced by laying the crimped continuous filaments under tension and subsequently releasing the tension, or a leather-like sheet material comprising a consolidated composite sheet comprising a mat of interpenetrated crimped continuous filaments having a non woven layer of unspun staple fibres needled on to or otherwise adhered to at least one surface of it, the interpenetration of the filaments being in the nature of an intermingling at random in three dimensions produced by laying the crimped continuous filaments under tension and subsequently releasing the tension, the continuous filaments and the nonwoven layer of unspun staple fibres being impregnated with a resinous or elastomeric bonding agent.

Further suitable sheet material is a leather-like sheet material comprising a consolidated mat of interpenetrated crimped continuous filaments bonded together with a resinous or elastomeric bonding agent, the interpenetration of the filaments being in the nature of an intermingling at random produced by laying the crimped continuous filaments under tension and subsequently releasing the ous filaments under tension and subsequently releasing the tension, a woven fabric bonded to one surface of the mat with a resinous or elastomeric bonding agent, and a surface layer of a resinous or elastomeric composition on that surface of the woven fabric which is remote from the mat.

One or more bonding agents may be used. A preferred bonding agent is natural rubber but other suitable bonding agents include polyurethane rubber (or precursors thereof), butyl rubber, rubbery styrene/butadiene copolymers, butadiene/acrylonitrile copolymers, and polychloroprene rubber.

A particularly suitable material is made from a web of crimped continuous nylon yarns with or without a layer of non-woven polypropylene staple fibres needled on to one of its surfaces using a natural rubber latex composition as the impregnant. The impregnant may constitute 75 percent of the total weight of the sheet material but will usually constitute about 60 percent of the total weight. The impregnated web is compressed to an average density of about 0.7 gram per cc. whereupon it provides a surface suitable for a coating in accordance with this invention. The surface may be reinforced and smoothed out by applying a preliminary coating of a rubber latex composition.

The graft polymer used to form the interlayer is a polymer consisting of molecules having a backbone chain of natural or synthetic rubber carrying branches of different composition. The vinyl monomer which is used to prepare the graft polymer may be any suitable monomer containing a

group which is capable of copolymerising with a natural or synthetic rubber such as vinyl esters, vinylidene compounds, alkyl methacrylates and acrylates such as methyl methacrylate and ethyl acrylate, acrylonitrile, acrylamide, vinyl pyridine and styrene. The natural or synthetic rubber is preferably in the form of a latex or aqueous dispersion. Suitable rubbers are natural rubber, butadiene/styrene, butadiene/acrylonitrile and butadiene/methylisopropenyl ketone copolymers, and polybutadiene. It is preferred to make the graft polymer by subjecting the monomer in the presence of the rubber latex to ionizing radiation or by stirring the monomer in the presence of the rubber latex and an initiator system such as benzoyl peroxide or tertiary-butyl hydroperoxide or cumene hydroperoxide with a polyamine, for example tetraethylenepentamine or ethylene diamine. However, any known method of producing a graft polymer may be employed, including methods of polymerising in solution provided that the graft polymer solution is subsequently emulsified, prior to gellation. The graft polymer may suitably contain from 5–50 weight percent of polymer units derived from the vinyl monomer.

The outer layer may be any aqueous polymeric composition suitable for coating a surface. The invention is particularly intended for use with acrylic polymer outer layers and nitrocellulose outer layers since these are outer layers which provide an advantageous finish on leather-like sheet material. Among suitable acrylic polymers are polymers of methyl methacrylate with one or more different acrylic or non-acrylic monomers such as ethyl acrylate, or ethyl acrylate and butyl hexyl acrylate, or ethyl acrylate and methacrylic acid. The acrylic polymer used to form the outer layer can be the same as the acrylic polymer applied to the gelled composition of a graft polymer. It is particularly preferred, when coating a surface of sheet material having natural rubber as bonding agent, to use a graft polymer based on natural rubber and methyl methacrylate in the interlayer, and to use a copolymer of methyl methacrylate with a different acrylic monomer in the outer layer.

The coatings in accordance with this invention show remarkably improved properties of adhesion to the surface of a leather-like sheet material as compared to the properties of an aqueous polymeric layer applied to the surface using an interlayer which has not been treated with a polyacrylate. For example, the adhesion of the outer layer to the interlayer may be up to twelve times greater when the interlayer is treated with a polyacrylate prior to applying the outer layer than when the interlayer is not so treated. The coatings of this invention are resistant to rubbing and scratching and to cracking atfer repeated flexing. A leather-like sheet material with a coating in accordance with this invention has a harder, more durable surface than an impregnated web without a coating. The interlayer of the graft polymer composition may be applied very thinly merely to improve adhesion between the outer layer and the sheet material or it may be applied more thickly as a levelling and filling layer for the sheet material.

Although the invention has been described with particular reference to coatings for surfaces of leather-like sheet material, it is to be understood that the invention is not limited thereto. For example, it may be used to provide a surface coating for rubber footwear such as Wellington boots. The graft polymer composition may be applied to the surface of the footwear before the rubber composition of the footwear is vulcanised. The outer layer may be applied to the treated surface after vulcanisation.

The invention is illustrated by the following examples, in which all "parts" are parts by weight.

EXAMPLE I 30 parts of methyl methacrylate containing 0.57 part of oleic acid was stirred into 116.7 parts of a natural rubber latex (60 percent total solids). 52 parts of distilled water and 1.52 parts of aqueous ammonia solution (density 0.88 gm./ml.) were stirred into the mixture which was then irradiated for 16 hours at a dose rate of $2.5 \times 10^4$ rads/hour from a cobalt 60 source.

The resulting graft polymer latex was compounded to the following formulation:

| | Parts |
|---|---|
| Graft polymer latex (50% solids) | 200 |
| Ammonia (density 0.88 g./ml.) | 2 |
| Potassium oleate soln. (15% solids | 2 |
| Sulphur (50) | 2.5 |
| Zinc mercaptobenzthiazole (50) | 1 |
| Di-betanaphthyl p-phenylene diamine (50) | 4 |
| Zinc diethyl dithiocarbamate (50) | 0.5 |
| Zinc oxide (50) | 2 |
| Ammonium chloride | 6 |

The ingredients except the ammonia and the ammonium chloride were used in the form of dispersions in distilled water, the amount of the particular ingredient (percentage by weight) in the dispersion being shown by the figure in brackets. The ammonium chloride was used in the form of a 20 percent aqueous ammoniacal solution having a pH of 10.

A natural rubber sheet, 0.010 inch thick, was prepared by coagulating a latex on a moving belt. A piece of the dried sheet measuring 12 inches by 12 inches was adhered to one surface of a woven rayon fabric using as adhesive a portion of the uncompounded graft polymer latex prepared as described in the first paragraph of this example. The woven fabric had the following secification:

Material: Bright continuous filament viscose rayon

| | |
|---|---|
| Yarn denier (warp and weft), 40 filaments | 100 |
| Ends/cm. (warp and weft) | 33 |
| Turns per metre (warp and weft) | 700S |
| Weight (gm./sq. metre) | 75 |

The rubber surface of the rubber-coated fabric was spray coated with 2 g. (dry weight) of the graft polymer composition prepared as described above, and this coating was gelled by heating the assembly in live steam for 3 minutes. The wet, gelled composition was then sprayed with a 5 percent solution in water of ammonium polyacrylate. After 1 minute, excess solution of ammonium polyacrylate was removed and the assembly was dried by heating it at 70° C. for 15 minutes in an air oven.

The assembly was cooled and the graft polymer surface thereof was spray coated with 4 g. of a pigmented acrylic emulsion having the formulation:

| | Parts |
|---|---|
| Acrylic emulsion | 1 |
| Aqueous pigment despersion (32% solids) | 1 |
| Distilled water | 1 | and the coated assembly was then dried by heating it for 3 minutes at 80° C.

The acrylic emulsion was a 50 percent aqueous emulsino of polyacrylates available under the trade name Primal AC 55.

The acrylic surface of the dried assembly was pressed against a polytetrafluoroethylene-covered dural plate preheated to 150° C. for 1 minute at a pressure of 45 pounds per square inch, and was then cooled to room temperature under a pressure of 15 pounds per square inch.

The uncoated surface of the woven rayon fabric was then adhered to the surface of a bonded fibrous web using as adhesive the uncompounded graft polymer latex prepared as described in the first paragraph of this example. The bonded fibrous web was prepared as follows. Two searate warp sheets of width 15 inches, each containing 100 ends of 840 denier nylon yarn (each yarn having 140 filaments of 6 denier per filament) were passed over separate hot plates and then over cooled knife edges to crimp the yarns. The two sheets of crimped yarns were then combined and the tension applied to the yarns was released to allow the yarns to relax and intermingle with one another to form a coherent fibrous web weighing 190 g. per square metre and having a width of 30 cm.

A carded web of 3 denier polypropylene staple fibres (staple length 4.5 mm.) was passed at a rate of 7 ft. per minute through a needle-punch machine and was needled at a penetration of 3 mm. The web, weighing 75 g. per square metre was superimposed on the web of nylon filaments and the assembly, weighing 265 g. per square metre was passed four times through a needle-punch machine so that it received a total of 170 needle punches per square cm. at a penetration of 4 mm.

A natural rubber latex composition was prepared according to the following formulation, using natural rubber latex containing 60 percent total solids:

| | Dry weight (g.) |
|---|---|
| Natural rubber latex | 100 |
| Sulphur | 1 |
| Di-beta-naphthyl paraphenylenediamine (40) | 1 |
| Zinc dibutyl dithiocarbamate (50) | 0.5 |
| Lamp black (30) | 0.3 |

The ingredients were used in the form of aqueous dispersions with the amount of the material in 100 g. of the dispersion being shown by the figures in the parentheses. 126 g. of this composition were then mixed with the following ingredients to form an impregnating composition:

| | Wet weight (g.) |
|---|---|
| Aqueous potassium oleate solution (15% solids) | 4.8 |
| Distilled water | 65 |
| Aqueous zinc oxide dispersion (50% solids) | 4.3 |
| Aqueous ammonium chloride (20%) | 5.75 |

The impregnating composition was used as follows to impregnate the needle-punched composite web prepared as described above. The needle-punched web was fed on to a moving belt and the impregnating composition was spread on its surface and was squeezed through the web by a roller. The composition was gelled by passing the impregnated web through a steam oven, and the web was then mangled to remove excess latex serum. The impregnated web was then dried at 70° C. in an air oven to yield a material containing 60 percent by weight of compound natural rubber.

The dried web was compressed to 1.4 mm. thickness whilst it was heated at 120° C. for 10 minutes in a spaced mould and was then cooled whilst still compressed. The nylon filament surface was raised to produce a nap, and the polypropylene fibre surface was bonded to the rayon fabric as hereinbefore described.

The product was a leather-like sheet having a surface adhesion, (i.e. the adhesion of the aqueous polymer composition outer layer to the interlayer) of 1200 g. per cm. width.

For purposes of comparison, the above procedure was repeated except that the gelled composition of a graft polymer was dried prior to application of the solution of ammonium polyacrylate. In this case the adhesion of the surface was 100 g. per cm. width, showing that the gelled composition should be treated with the ammonium polyacrylate prior to drying the gelled composition.

EXAMPLE II

The procedure outlined in Example I was repeated five times except that in each case the graft polymer was replaced by one of natural rubber, methyl methacrylate (MMA) and butyl methacrylate (BMA) as shown in the table below, in which the surface adhesion (g./cm. width) is also given.

TABLE

| Natural Rubber | MMA | BMA | Surface Adhesion |
|---|---|---|---|
| 70 | 25 | 5 | 1,200 |
| 70 | 20 | 10 | 1,300 |
| 70 | 15 | 15 | 700 |
| 70 | 10 | 20 | 500 |
| 70 | 5 | 25 | 300 |

EXAMPLE III

The procedure outlined in Example I was repeated using a graft polymer latex composed of 70 parts of natural rubber, 25 parts of poly (methyl methacrylate) and 5 parts of poly (butyl methacrylate). In this case the wet gelled composition was treated with the following composition instead of a 5 percent aqueous ammonium polyacrylate solution.

| | Parts |
|---|---|
| Primal black (13% aqueous dispersion of carbon black) | 1 |
| Acrylic emulsion | 1 |
| Distilled water | 3 |

The acrylic emulsion was a 50 percent aqueous emulsion of polyacrylates available under the trade name of Primal AC 55.

The surface adhesion in this case was 1200 g./cm. width.

EXAMPLE IV

The procedure outlined in Example III was repeated except in this case the graft polymer composition was applied by doctor blade spreading instead of spraying.

The surface adhesion in this case was 1300 g./cm. width.

EXAMPLE V

The procedure outlined in Example III was repeated except in this case the graft polymer composition was gelled for 1 min. in hot humid air at 70° C. and 95% relative humidity.

The surface adhesion in this case was 1300 g./cm. width.

Having now described my invention, what I claim is:

1. A method of coating a surface comprising a natural or synthetic rubber composition which comprises applying to the surface an interlayer of an aqueous gellable composition of a graft polymer of a vinyl monomer and a natural or synthetic rubber, gelling the composition of the graft polymer, applying to the gelled composition an aqueous solution or emulsion of a polyacrylate whilst the graft polymer composition is still wet, drying the gelled composition containing the polyacrylate, and applying to the interlayer an outer layer of an aqueous polymeric composition based on nitrocellulose or an acrylic polymer.

2. A method according to claim 1 in which the polyacrylate is ammonium polyacrylate.

3. A method according to claim 1 in which said gelling is performed by heating.

4. A method according to claim 3 in which the heating is performed by subjecting the composition of a graft polymer to live steam.

5. A method according to claim 1 in which the aqueous polymeric composition is an acrylic polymer composition.

6. A method according to claim 1 in which the vinyl monomer is an alkyl acrylate or methacrylate.

7. A method according to claim 6 in which the alkyl methacrylate is methyl methacrylate.

8. A method according to claim 1 in which the graft polymer comprises a backbone chain of natural rubber.

9. A method according to claim 8 in which the graft polymer is one of natural rubber with methyl methacrylate and butyl methacrylate.

10. A method according to claim 1 in which the graft polymer comprises a backbone chain of a synthetic rubber.

11. A method according to claim 1 in which the graft polymer is prepared by subjecting the vinyl monomer to ionising radiation in the presence of a rubber latex.

12. A method according to claim 1 in which the graft polymer is prepared by stirring the vinyl monomer with a rubber latex in the presence of an initiator system.

13. A method according to claim 1 in which the graft polymer contains from 5 to 50 percent by weight of polymer units derived from the vinyl monomer.

References Cited

UNITED STATES PATENTS

| | | | |
|---|---|---|---|
| 2,422,550 | 6/1947 | Jacobson | 260—4 |
| 2,697,048 | 12/1954 | Secrist. | |
| 2,857,360 | 10/1958 | Feuer | 260—879 |
| 2,973,284 | 2/1961 | Semegen. | |
| 2,978,785 | 4/1961 | Wenzell et al. | |
| 3,012,911 | 12/1961 | Moser. | |
| 3,026,293 | 3/1962 | Caldwell et al. | 117—135.5 X |
| 3,125,462 | 3/1964 | Rachinsky. | |
| 3,143,522 | 8/1964 | Conard et al. | 260—880 |
| 3,377,194 | 4/1968 | Smith et al. | |

MURRAY KATZ, Primary Examiner

R. HUSACK, Assistant Examiner

U.S. Cl. X.R.

117—76, 80, 78, 119.8, 138.8